United States Patent
Ko et al.

(10) Patent No.: US 10,348,538 B2
(45) Date of Patent: Jul. 9, 2019

(54) TRANSMITTER PERFORMING AN EQUALIZING OPERATION

(71) Applicants: SK hynix Inc., Icheon-si, Gyeonngi-do (KR); Seoul National University R&DB Foundation, Seoul (KR)

(72) Inventors: Hyeongjun Ko, Suwon-si (KR); Mino Kim, Seoul (KR); Suhwan Kim, Seoul (KR); Deog-Kyoon Jeong, Seoul (KR)

(73) Assignees: SK hynix Inc., Icheon-si, Gyeonggi-do (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 16/000,536

(22) Filed: Jun. 5, 2018

(65) Prior Publication Data

US 2018/0359121 A1 Dec. 13, 2018

(30) Foreign Application Priority Data

Jun. 9, 2017 (KR) .......................... 10-2017-0072420

(51) Int. Cl.
  *H04L 27/01* (2006.01)
  *H04L 25/02* (2006.01)
  *H04L 25/497* (2006.01)
  *H04L 25/03* (2006.01)

(52) U.S. Cl.
  CPC ............ *H04L 27/01* (2013.01); *H04L 25/028* (2013.01); *H04L 25/03343* (2013.01); *H04L 25/497* (2013.01)

(58) Field of Classification Search
  CPC . H04L 27/01; H04L 25/028; H04L 25/03343; H04L 25/497
  USPC .......................................................... 375/229
  See application file for complete search history.

(56) References Cited

U.S. PATENT DOCUMENTS

2014/0368237 A1* 12/2014 Hong ................. H03K 19/0016
  327/108

FOREIGN PATENT DOCUMENTS

KR  1020150016468 A  2/2015

OTHER PUBLICATIONS

Chang-Kyo Lee et al., "A 6.4Gb/s/pin at Sub_IV Supply Voltage TX-interleaving Technique for Mobile DRAM Interface", 2015 Symposium on VLSI Circuits Digest of Technical Papers, pp. C182-C183, Hwasung, Gyeonggi-do, Republic of Korea.

* cited by examiner

*Primary Examiner* — Michael R Neff
(74) *Attorney, Agent, or Firm* — William Park & Associates LTD.

(57) ABSTRACT

A transmitter may include a driver having a PMOS transistor and an NMOS transistor connected in series between a first power supply and a second power supply. The driver may be configured to output an output signal. The transmitter may further include a driver control circuit configured to control a gate voltage of the PMOS transistor and a gate voltage of the NMOS transistor based on a level of a data signal, an occurrence of a level transition of the data signal, and a direction of the level transition of the data signal.

16 Claims, 6 Drawing Sheets

<Prior Art>

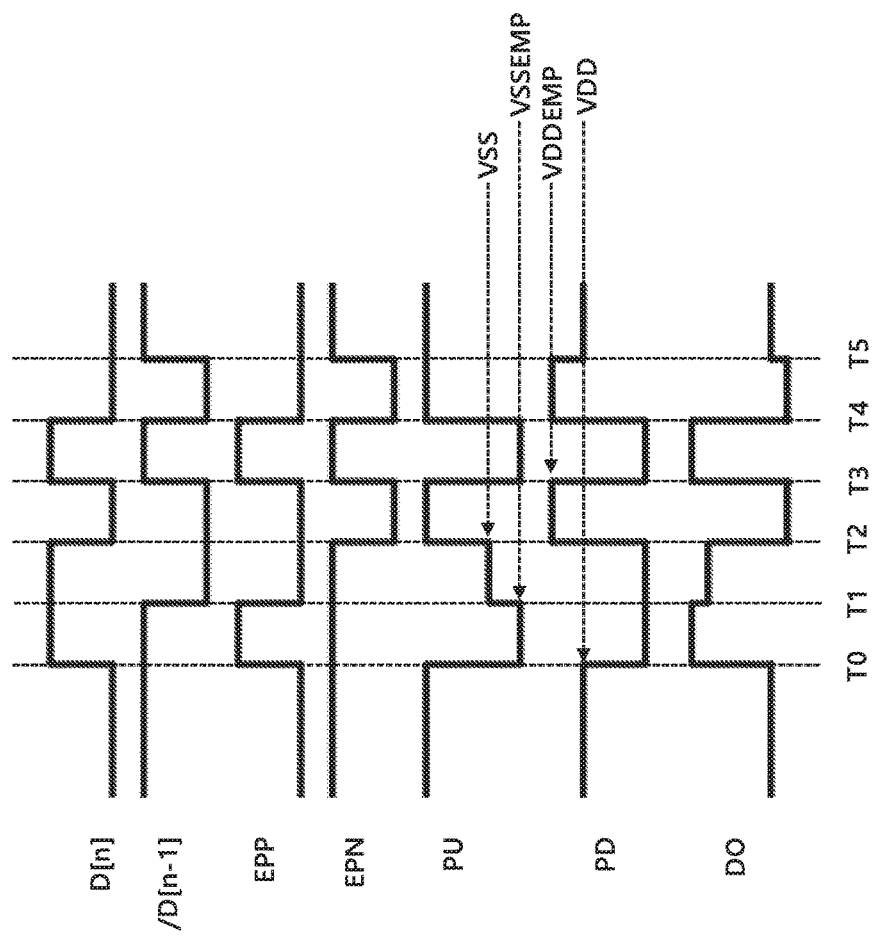

TRANSMITTER PERFORMING AN EQUALIZING OPERATION

CROSS-REFERENCE TO RELATED APPLICATIONS

The present application claims priority under 35 U.S.C. § 119(a) to Korean Patent Application No. 10-2017-0072420, filed on Jun. 9, 2017, which is incorporated herein by reference in its entirety.

BACKGROUND

1. Technical Field

Various embodiments may generally relate to a transmitter performing an equalizing operation.

2. Related Art

A conventional transmitter distorts a signal in advance of transmitting through a pre-emphasis operation to compensate for distortion of the signal in the channel.

The pre-emphasis operation is an equalizing operation performed at the transmitter.

Conventional transmitters include an equalization driver for pre-emphasis in addition to the main driver for generating signals.

FIG. 1 shows a circuit diagram illustrating a conventional transmitter.

The conventional transmitter includes a main driver 10, an auxiliary driver 20 in parallel with the main driver 10, a main driver controller 30, and an auxiliary driver controller 40.

The main driver 10 drives the output terminal DO in accordance with the main driver controller 30.

The auxiliary driver 20 provides a pre-emphasis signal to the output terminal DO in accordance with the auxiliary driver controller 40.

The main driver 10 includes a PMOS transistor 11 and an NMOS transistor 12 connected between a first power supply VDD and a second power supply VSS or ground. The common drain of both transistors is connected to the output terminal DO.

The main driver controller 30 includes a NAND gate 31, and inverters 32 and 33 to turn on the PMOS transistor 11 to provide the first power supply voltage VDD at the output terminal DO when both the data signal D [n] and the activation signal EN are high level.

The main driver controller 30 also includes a NOR gate 34, and inverters 35 and 36 to turn on the NMOS transistor 12 to provide the second power voltage VSS at the output terminal DO when the data signal D [n] is at the low level and the activation signal EN is at the high level.

The auxiliary driver 20, in parallel with the main driver 10, includes a PMOS transistor 21 and an NMOS transistor 22 also connected between a first power supply VDD and a second power supply VSS or ground. The common drain of both transistors is connected to the output terminal DO.

The auxiliary driver controller 40 includes a NAND gate 41 and inverters 42 and 43 to turn on the PMOS transistor 21 to provide a first power supply voltage VDD to the output terminal DO when the data signal D [n] is at a high level and the previous data signal D [n−1] is at a low level. The signal /D [n−1] is obtained by inverting the previous data signal.

The auxiliary driver controller 40 also includes a NOR gate 44, and inverters 45 and 46 to turns the NMOS transistor 22 to provide a second power supply voltage VSS to the output terminal DO when the data signal D [n] is at the low level and the previous data signal D [n−1] is at the high level.

Thus, in the conventional transmitter, the auxiliary driver 40, in parallel with the main driver 10, provides additional current to the output terminal DO in the same direction as the main driver 10 when the signal transmits.

The conventional transmitter has a problem in that the output capacitance CIO is increased because the main driver 10 and the auxiliary driver 20 are connected in parallel to the output terminal DO.

As the output capacitance CIO increases, it is difficult to increase the bandwidth and the quality of the signal deteriorates.

SUMMARY

In accordance with the present teachings, a transmitter may include a driver having a PMOS transistor and an NMOS transistor connected in series between a first power supply and a second power supply. The driver may be configured to output an output signal. The transmitter may further include a driver control circuit configured to control a gate voltage of the PMOS transistor and a gate voltage of the NMOS transistor based on a level of a data signal, an occurrence of a level transition of the data signal, and a direction of the level transition of the data signal.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed novelty, and explain various principles and advantages of those embodiments.

FIG. 6 shows a timing diagram illustrating an operation of a transmitter according to an embodiment of the present disclosure.

DETAILED DESCRIPTION

The following detailed description references the accompanying figures in describing exemplary embodiments consistent with this disclosure. The exemplary embodiments are provided for illustrative purposes and are not exhaustive. Additional embodiments not explicitly illustrated or described are possible. Further, modifications can be made to presented embodiments within the scope of the present teachings. The detailed description is not meant to limit this disclosure. Rather, the scope of the present disclosure is defined only in accordance with the presented claims and equivalents thereof.

Figure 1:
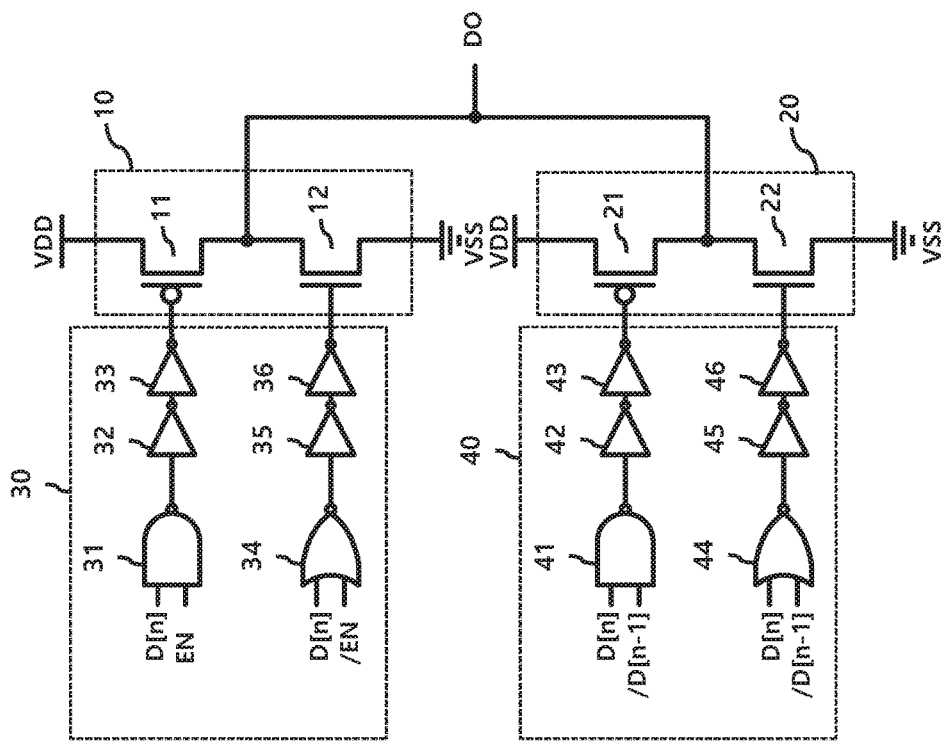
FIG. 1 shows a circuit diagram illustrating a conventional transmitter.
Figure 2:
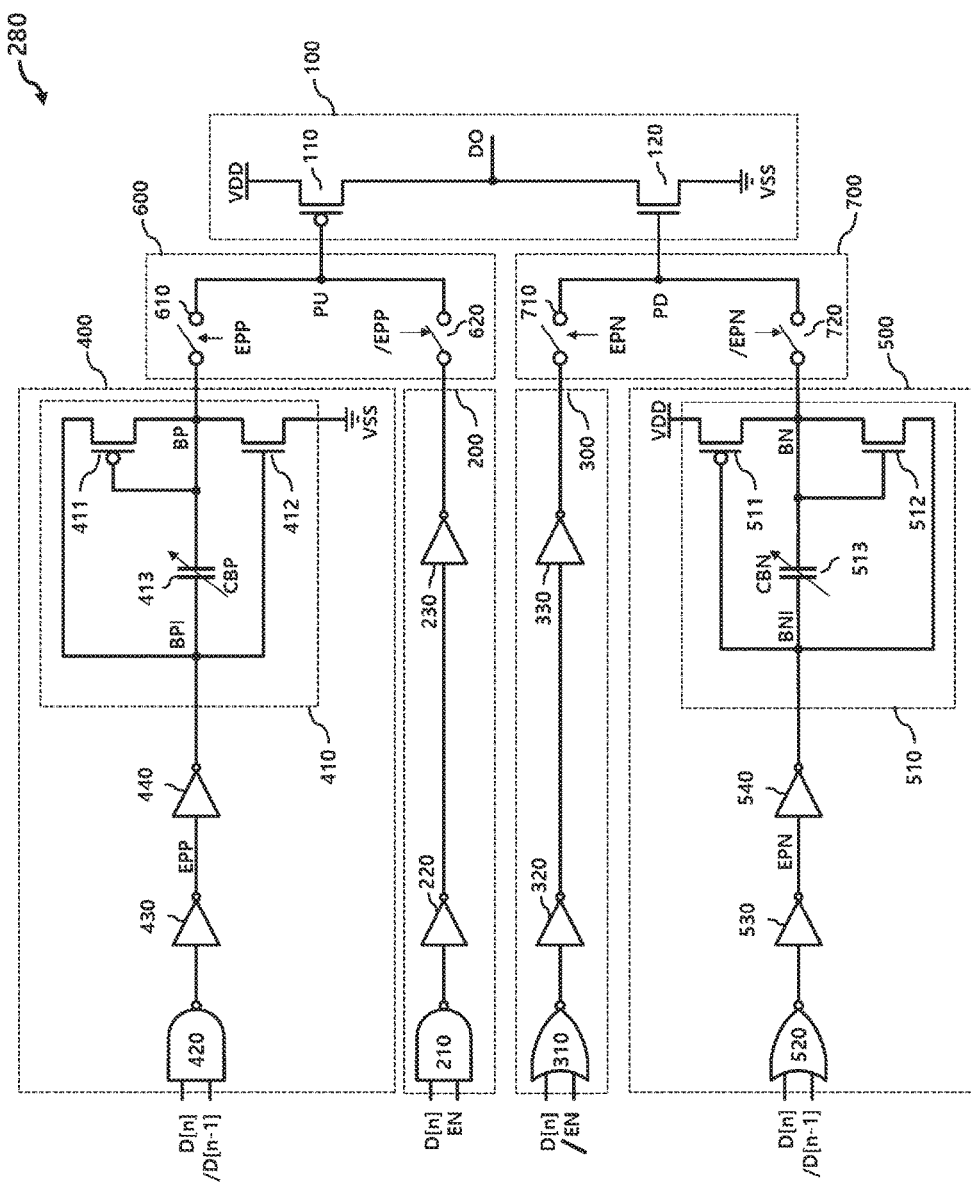
FIG. 2 shows a circuit diagram illustrating a transmitter according to an embodiment of the present disclosure.

FIG. 2 shows a circuit diagram illustrating a transmitter 280 according to an embodiment of the present disclosure.

The transmitter 280 is shown to include a driver 100, a first controller 200, a second controller 300, a first equalization controller 400, a second equalization controller 500, a first selector 600, and a second selector 700.

The circuits 200, 300, 400, 500, 600, 700 of FIG. 2, with the exception of the driver 100, may be collectively referred to as a driver control circuit.

The driver 100 includes a PMOS transistor 110 having its source connected to a first power supply VDD and an NMOS transistor 120 having its source connected to a second power supply VSS.

The common drain of the PMOS transistor 110 and the NMOS transistor 120 is connected to the output terminal DO. In this way, the PMOS transistor and the NMOS transistor are connected in series between the first power supply VDD and the second power supply VSS.

The gate of the PMOS transistor 110 receives the first gate voltage PU from the first controller 200 or the first equalization controller 400 through the first selector 600.

The gate of the NMOS transistor 120 receives the second gate voltage PD from the second controller 300 or the second equalization controller 500 through the second selector 700.

For the embodiment illustrated by FIG. 2, a separate auxiliary driver for the equalization operation is not included in addition to the driver 100.

For the embodiment illustrated by FIG. 2, the gate voltage of the transistors included in the driver 100 are adjusted to perform signal driving and equalizing operations.

This is described in detail below with reference to the timing diagram of FIG. 4.

The first controller 200 outputs a signal corresponding to the data signal D [n] when the activation signal EN is at the high level.

The first controller 200 includes a NAND gate 210 for performing a NAND operation on the activation signal EN and the data signal D [n], an inverter 220 for inverting the output of the NAND gate 210, and an inverter 230 for inverting the output of the inverter 220.

When the activation signal EN is at the high level, the first controller 200 outputs a low level if the data signal D [n] is at a high level, and the first controller 200 outputs a low level if the data signal D [n] is at a low level.

The second controller 300 outputs a signal corresponding to the data signal D [n] when the activation signal EN is at the high level.

The second controller 300 includes a NOR gate 310 for performing a NOR operation on the activation signal EN and the data signal D [n], an inverter 320 for inverting the output of the NOR gate 310, and an inverter 330 for inverting the output of the inverter 320.

When the activation signal EN is at the high level, the second controller 300 outputs a low level if the data signal D [n] is at a high level and the second controller 300 outputs a high level if the data signal D [n] is at a high level.

The first equalization controller 400 performs a first equalization operation when the data signal transitions from a low level to a high level and the second equalization controller 500 performs a second equalization operation when the data signal transitions from a high level to a low level. A transition, also referred to as a level transition, is directional in that the transition can be from a low level to a high level or from a high level to a low level.

The first equalization controller 400 includes a first bootstrap circuit 410, a NAND gate 420, and inverters 430 and 440.

The NAND gate 420 performs a NAND operation on the data signal D [n] and the signal /D [n−1] obtained by inverting the previous data signal.

Accordingly, the output of the NAND gate 420 becomes low level only when the data signal D [n] is at a high level and the previous data signal D [n−1] is at a low level.

The inverter 430 inverts the output of the NAND gate 420 and outputs a first equalization signal EPP.

The first equalization signal EPP becomes a high level only when the data signal D [n] is at a high level and the previous data signal D [n−1] is at a low level, and in the remaining cases, it is at a low level.

The inverter 440 outputs the inverted signal of the first equalization signal EPP.

The first bootstrap circuit 410 includes a first input terminal BPI and a first output terminal BP. The output of the inverter 440 is provided to the first input terminal BPI.

The first bootstrap circuit 410 includes a first PMOS transistor 411, a first NMOS transistor 412, and a first variable capacitor 413.

The capacitance CBP of the first variable capacitor 413 can be controlled in accordance with a control signal.

Figure 3:
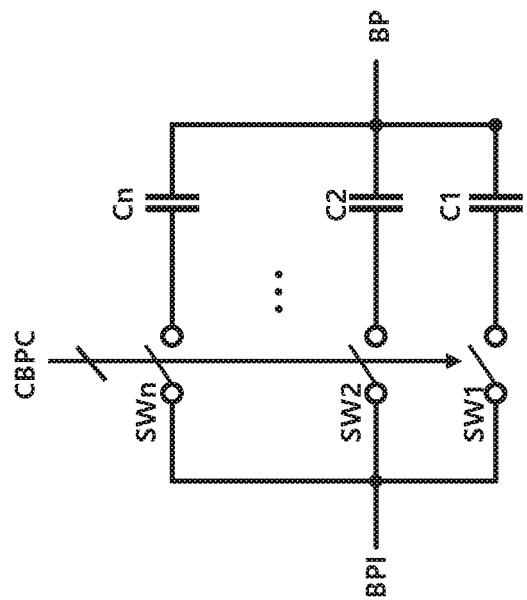
FIG. 3 shows a circuit diagram illustrating a variable capacitor according to an embodiment of the present disclosure.

FIG. 3 shows a circuit diagram illustrating a variable capacitor according to an embodiment of the present disclosure. With respect to the following description, the variable capacitor shown in FIG. 3 is taken to be the first variable capacitor 413 shown in FIG. 2.

The first variable capacitor 413 may include a plurality of switches SW1, SW2, . . . , SWn and a plurality of capacitors C1, C2, . . . , Cn.

Pairs of one switch and one capacitor are connected in series, and a plurality of such switch-capacitor pairs are connected in parallel between the first input terminal BPI and the first output terminal BP shown in FIG. 2.

The plurality of switches SW1, SW2, . . . , SWn may be controlled by a first capacitor control signal CBPC, which is a multi-bit digital signal for an embodiment.

Returning to FIG. 2, the gate and the drain of the first PMOS transistor 411 are commonly connected to the first output terminal BP. The source of the first PMOS transistor 411 is connected to the first input terminal BPI.

The gate of the first NMOS transistor 412 is connected to the first input terminal BPI. The source of the first NMOS transistor 412 is connected to the second power supply VSS, and the drain of the first NMOS transistor 412 is connected to the first output terminal BP.

Hereinafter, it is assumed that the parasitic capacitance existing at the first output terminal BP is Cpp and that the threshold voltage of the first PMOS transistor 411 is Vthp.

When the data signal does not transition from the low level to the high level, that is, when the first equalization signal EPP is at the low level, the voltage of the first input terminal BPI becomes VDD (high level).

Accordingly, the first PMOS transistor 411 and the first NMOS transistor 412 are turned on.

Since the first PMOS transistor 411 is diode-connected, the voltage of the first output terminal BP is given as VDD−Vthp.

Accordingly, the first variable capacitor 413 is charged by the voltage between the first input terminal BPI and the first output terminal BP.

A first equalization voltage VBP output from the first output terminal BP when the data signal transitions from a low level to a high level is expressed by the following equation:

$$VBP=Cpp/(CBP+Cpp) \times VDD-Vthp.$$

It can be seen from the above equation that the value of the first equalization voltage VBP can be adjusted by adjusting the capacitance of the first variable capacitor 413.

Generally, since the parasitic capacitance is much smaller than that capacitance of the first variable capacitor, the voltage of the first output terminal BP has a voltage level lower than that of the second power supply VSS, which for an embodiment represents the ground voltage.

Accordingly, the first equalization controller 400 may turn on the PMOS transistor 110 of the driver 100 more strongly to increase the swing width of the output signal.

The first selector 600 includes a first switch 610 and a second switch 620.

The first switch 610 is turned on when the first equalization signal EPP is at the high level and the second switch 620 is turned on when the first equalization signal EPP is at the low level.

As described above, the first equalization signal EPP has a high level only when the data signal D [n] transitions from a low level to a high level and has a low level in the remaining cases.

Accordingly, the first selector 600 selects the output of the first equalization controller 400 when the data signal D [n] transitions from the low level to the high level.

The second equalization controller 500 includes a second bootstrap circuit 510, a NOR gate 520, and inverters 530 and 540.

The NOR gate 520 performs a NOR operation on the data signal D [n] and the signal /D [n−1] obtained by inverting the previous data signal.

Accordingly, the output of the NOR gate 520 becomes a high level only when the data signal D [n] is at a low level and the previous data signal D [n−1] is at a high level.

Inverter 530 inverts the output of NOR gate 520 and outputs a second equalization signal EPN.

The second equalization signal EPN becomes low level only when the data signal D [n] is at the low level and the previous data signal D [n−1] is at the high level. The second equalization signal EPN becomes high level in all other cases.

The inverter 540 outputs the inverted signal of the second equalization signal EPN.

The second bootstrap circuit 510 includes a second input terminal BNI and a second output terminal BN. The output of the inverter 540 is provided to the second input terminal BNI.

The second bootstrap circuit 510 includes a second PMOS transistor 511, a second NMOS transistor 512, and a second variable capacitor 513.

The capacitance CBN of the second variable capacitor 513 may be variably controlled according to the control signal and may be implemented analogous to the first variable capacitor 413 of FIG. 3.

The gate and the drain of the second NMOS transistor 512 are connected in common to the second output terminal BN. The source of the second NMOS transistor 512 is connected to the second input terminal BNI.

The gate of the second PMOS transistor 511 is connected to the second input terminal BNI. The source of the second PMOS transistor 511 is connected to the first power supply VDD, and the drain of the second PMOS transistor 511 is connected to the second output terminal BN.

Hereinafter, it is assumed that the parasitic capacitance existing at the second output terminal BN is Cpn and that the threshold voltage of the second NMOS transistor 512 is Vthn.

When the data signal does not transition from the high level to the low level, that is, when the second equalization signal EPN is at the high level, the voltage of the second input terminal BNI becomes VSS (low level).

Accordingly, the second PMOS transistor 511 and the second NMOS transistor 512 are turned on.

Since the second NMOS transistor 512 is diode-connected, the voltage of the second output terminal BN is given as Vthn.

Accordingly, the second variable capacitor 513 is charged by the voltage between the second input terminal BNI and the second output terminal BN.

A second equalization voltage VBN output from the second output terminal BN when the data signal transitions from the high level to the low level is expressed by the following equation:

$$VBN=CBN/(CBN+Cpn) \times VDD+Vthn.$$

It can be seen from the above equation that the value of the second equalization voltage VBN can be adjusted by adjusting the capacitance of the second variable capacitor 513.

Generally, since the capacitance of the parasitic capacitor is much smaller than that of the second variable capacitor, the voltage of the second output terminal BN has a voltage level higher than that of the first power supply VDD.

Accordingly, the second equalization controller 500 can turn on the NMOS transistor 120 of the driver 100 more strongly to increase the swing width of the output signal.

The second selector 700 includes a third switch 710 and a fourth switch 720.

The third switch 710 is turned on when the second equalization signal EPN is at the high level and the fourth switch 720 is turned on when the second equalization signal EPN is at the low level.

As described above, the second equalization signal EPN has a low level only when the data signal D [n] transitions from a high level to a low level. The second equalization signal EPN has a high level in all other cases.

Accordingly, the second selector 700 selects the output of the second equalization controller 500 when the data signal D [n] transitions from the high level to the low level.

Figure 4:
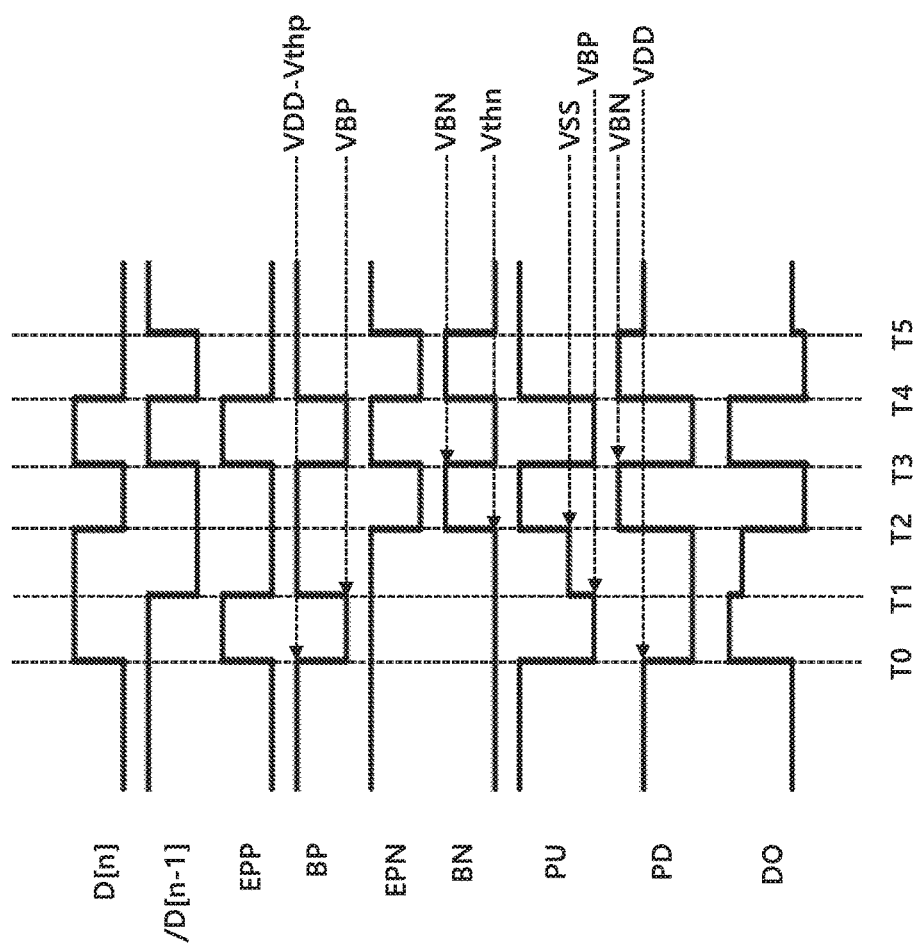
FIG. 4 shows a timing diagram illustrating an operation of a transmitter according to an embodiment of the present disclosure.

FIG. 4 shows a timing diagram illustrating an operation of the transmitter 280 of FIG. 2. In particular, FIG. 4 shows levels of the data signal D [n], the inverse signal /D [n−1] of the previous data signal D [n−1], the first equalization signal EPP, the first output terminal BP, the second equalization signal EPN, the second output terminal BN, the output voltage PU of the first selector 600, the output voltage PD of the second selector 700, and the output signal DO of the driver 100 at times T0, T1, T2, T3, T4, and T5.

The data signal D [n] transitions to a high level at T0 and T3, transitions to a low level at T2 and T4, maintains a high level at T1, and maintains a low level at T5.

The first equalization signal EPP maintains a high level in periods T0-T1 and T3-T4 and a low level in the remaining periods.

The second equalization signal EPN maintains a low level in periods T2-T3 and T4-T5 and a high level in the remaining periods.

The output voltage PU of the first selector 600 is determined according to the output of the first equalization controller 400 at T0-T1 and T3-T4 and the output voltage PU of the first controller 200 at T1-2.

The output voltage PD of the second selector 700 is determined according to the output of the second equalization controller 500 at T2-T3 and T4-T5 and is determined according to the output of the second controller 300 at T5.

The voltage of the first output terminal BP of the first equalization controller 400 has a voltage VBP lower than that of the second power supply VSS or ground at T0-T1 and T3-T4.

Accordingly, the output voltage PU of the first selector 600 is equal to the output voltage VBP of the first equalization controller 400 at T0-T1 and T3-T4 and the output voltage PU of the first controller 200 is equal to the second power supply VSS at T1-T2.

The voltage VBN of the second output terminal BN of the second equalization controller 500 is higher than that of the first power supply voltage VDD at T2-T3 and T4-T5.

Accordingly, the output voltage PD of the second selector 700 is equal to the output voltage VBN of the second equalization controller 500 at T2-T3 and T4-T5, and at the output voltage PD of the second selector 700 is equal to the first power supply voltage VDD at T5.

Accordingly, the output signal DO output from the driver 100 can swing with a larger width because the driving current increases at T0-T1, T3-T4, T2-T3, and T4-T5.

As described above, a transmitter according to the present disclosure, such as the transmitter 280, can perform both signal driving and an equalizing operation using a driver without using an auxiliary driver as in the conventional art.

Figure 5:
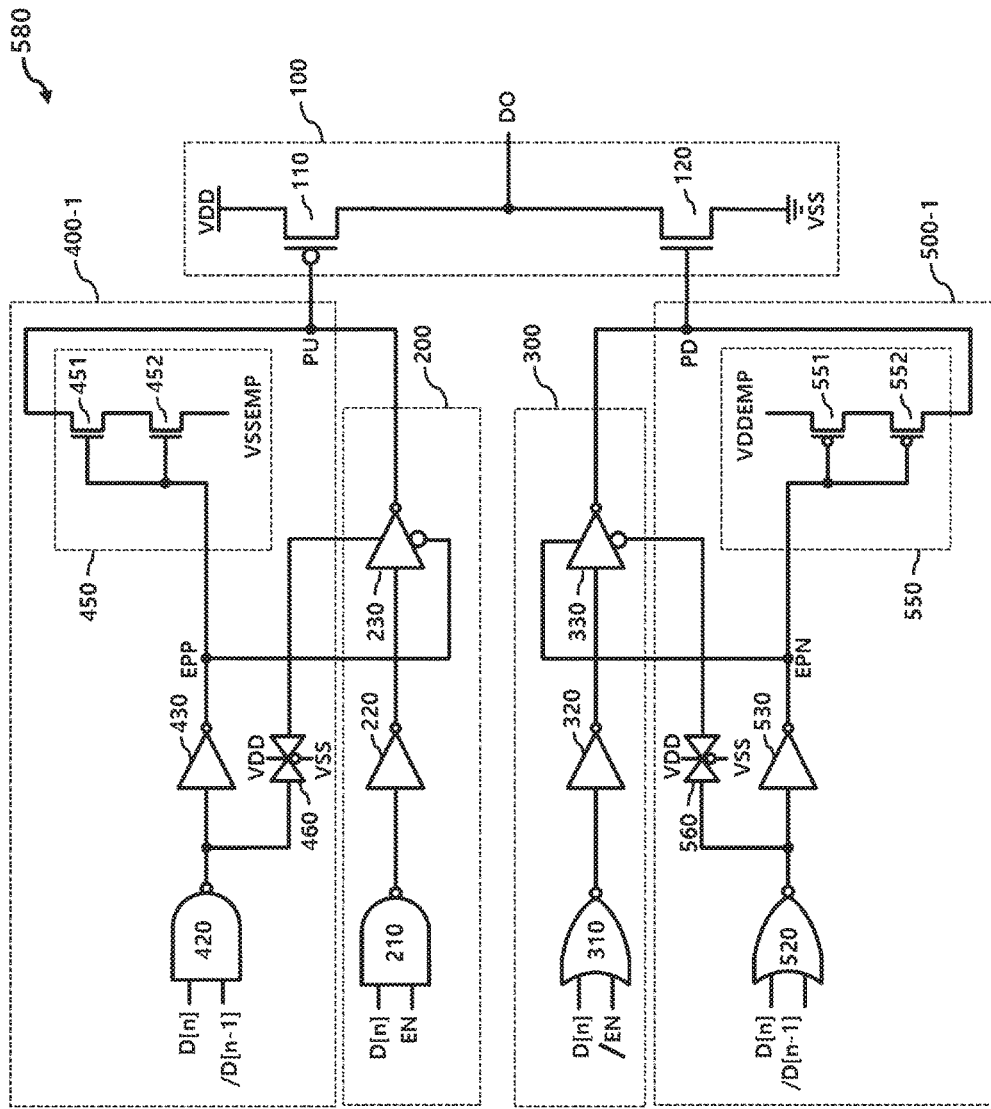
FIG. 5 shows a circuit diagram illustrating a transmitter according to an embodiment of the present disclosure.

FIG. 5 is a circuit diagram illustrating a transmitter 580 according to an embodiment of the present disclosure.

For an embodiment illustrated by FIG. 2, the first equalization controller 400 and the second equalization controller 500 generate voltages higher than that of the first power supply VDD or lower than that of the second power supply VSS.

For an embodiment illustrated by FIG. 5, a first equalization voltage VSSEMP is lower than that of the second power supply VSS or the second equalization voltage VDDEMP is higher than that of the first power supply VDD.

The first equalization voltage VSSEMP and the second equalization voltage VDDEMP may be input directly from an external power supply or may be generated by another module in the transmitter 580.

The transmitter 580 is shown to include the driver 100, the first controller 200, the second controller 300, a first equalization controller 400-1, and a second equalization controller 500-1.

The circuits 200, 300, 400-1, 500-1 of FIG. 5, with the exception of the driver 100, may be referred as a driver control circuit.

The configurations of the driver 100, the first controller 200, and the second controller 300 are substantially the same as described for FIG. 2, thus a repeated description is omitted here.

However, in the first controller 200, the inverter 230 performs the first equalization operation when the first equalized signal EPP is at the high level, that is when the data signal transitions from the low level to the high level and the inverter 230 transitions to a high-impedance state.

Also, in the second controller 300, the inverter 330 performs the second equalization operation when the second equalization signal EPN is at the low level, that is when the data signal transitions from the high level to the low level and the inverter 330 transitions to a high-impedance state.

The first equalization controller 400-1 is shown to include the NAND gate 420 and the inverter 430. Their operation is the same as previously described with reference to FIG. 2.

The first equalization controller 400-1 further includes a first equalization voltage transfer circuit 450 and a switch 460.

The first equalization voltage transfer circuit 450 applies the first equalization voltage VSSEMP to the gate PU of the PMOS transistor 110 when the first equalization signal EPP is at a high level.

The first equalization voltage transfer circuit 450 includes NMOS transistors 451 and 452 receiving a first equalization signal EPP at their gates.

In this embodiment, the switch 460 is implemented as a turn-on transfer gate and provides the output of the NAND gate 420 as a control signal to the tri-state inverter 230.

The output of the first equalization controller 400-1 is applied to the gate of the PMOS transistor 110 when the first equalization signal EPP is at a high level, that is, when the data signal transitions from a low level to a high level. The output of the first controller 200 is applied to the gate of the PMOS transistor 110 for remaining periods.

The second equalization controller 500-1 includes the NOR gate 520 and the inverter 530. Their operation is the same as previously described with reference to FIG. 2.

The second equalization controller 500-1 further includes a second equalization voltage transfer circuit 550 and a switch 560.

The second equalization voltage transfer circuit 550 applies the second equalization voltage VDDEMP to the gate PD of the NMOS transistor 120 when the second equalization signal EPN is at a low level.

The second equalization voltage transfer unit 550 includes PMOS transistors 551 and 552 receiving a second equalization signal EPN at their gates.

In this embodiment, the switch 560 is implemented as a turn-on transfer gate and provides the output of the NOR gate 520 as a control signal to the tri-state inverter 330.

The output of the second equalization controller 500-1 is applied to the gate of the NMOS transistor 120 when the second equalization signal EPN is at a low level, that is, when the data signal transitions from a high level to a low level. The output of the second controller 300 is applied to the gate of the NMOS transistor 120 for remaining periods.

FIG. 6 is a timing diagram illustrating an operation of a transmitter of FIG. 5.

The timing diagram of FIG. 6 is substantially the same as the timing diagram of FIG. 4. In particular, FIG. 6 shows levels of the data signal D [n], the inverse signal /D [n−1] of the previous data signal D [n−1], the first equalization signal EPP, the second equalization signal EPN, the input voltage PU at the gate of the PMOS transistor 110, the input voltage PD at the gate of the NMOS transistor 120, and the output signal DO of the driver 100 at times T0, T1, T2, T3, T4, and T5.

The first equalization voltage VSSEMP output from the first equalization controller 400-1 is applied to the gate PU of the PMOS transistor 110 at T0-T1 and T3-T4, and the second power supply VSS is applied to the gate PU of the PMOS transistor 110 at T1-T2.

The second equalization voltage VDDEMP output from the second equalization controller 500-1 is applied to the gate PD of the NMOS transistor 120 at T2-T3 and T4-T5, and the first power supply VDD is applied to the gate PD of the NMOS transistor 120 at T5.

As described above, a transmitter according to the present disclosure, such as the transmitter 580, can perform both signal driving and an equalizing operation using one driver without using an auxiliary driver as in the conventional art.

Although various embodiments have been described for illustrative purposes, it will be apparent to those skilled in the art that various changes and modifications may be made to the described embodiments without departing from the spirit and scope of the disclosure as defined by the following claims.

What is claimed is:

1. A transmitter comprising:
    a driver comprising a PMOS transistor and an NMOS transistor connected in series between a first power supply and a second power supply, the driver configured to output an output signal; and
    a driver control circuit configured to control a gate voltage of the PMOS transistor and a gate voltage of the NMOS transistor based on a level of a data signal, an occurrence of a level transition of the data signal, and a direction of the level transition of the data signal,
    wherein the driver control circuit comprises:
    a first controller configured to control the gate voltage of the PMOS transistor when the data signal is at a high level;
    a second controller configured to control the gate voltage of the NMOS transistor when the data signal is at a low level less than the high level;
    a first equalization controller configured to control the gate voltage of the PMOS transistor when the data signal transitions from the low level to the high level; and
    a second equalization controller configured to control the gate voltage of the NMOS transistor when the data signal transitions from the high level to the low level.

2. The transmitter of claim 1, wherein the first controller provides a voltage of the second power supply to a gate of the PMOS transistor when the data signal is at the high level, and wherein the second controller provides a voltage of the first power supply to a gate of the NMOS transistor when the data signal is at the low level.

3. The transmitter of claim 2, wherein the first equalization controller provides the gate of the PMOS transistor with a first equalization voltage lower than the voltage of the second power supply when the data signal transitions from the low level to the high level, and wherein the second equalization controller provides the gate of the NMOS transistor with a second equalization voltage higher than the voltage of the first power supply when the data signal transitions from the high level to the low level.

4. The transmitter of claim 1, wherein the first equalization controller outputs a first equalization signal indicating when the data signal transitions from a low level to a high level, and wherein the second equalization controller outputs a second equalization signal indicating when the data signal transitions from the high level to the low level.

5. The transmitter of claim 4, wherein the first equalization controller includes a first bootstrap circuit configured to output a first equalization voltage lower than a voltage of the second power supply based on the first equalization signal.

6. The transmitter of claim 5, wherein the driver control circuit further comprises a first selector configured to select an output of the first controller or an output of the first equalization controller based on the first equalization signal.

7. The transmitter of claim 5, wherein the first bootstrap circuit includes a first capacitor for charging when the data signal does not transition from the low level to the high level.

8. The transmitter of claim 7, wherein capacitance of the first capacitor varies based on a control signal.

9. The transmitter of claim 4, wherein the first equalization controller includes a first equalization voltage transfer circuit to output a first equalization voltage based on the first equalization signal, wherein the first equalization voltage is less than a voltage of the second power supply and the first equalization voltage is generated by the first equalization controller.

10. The transmitter of claim 9, wherein the first equalization controller controls an output of the first controller to be at a high-impedance state based on the first equalization signal.

11. The transmitter of claim 4, wherein the second equalization controller includes a second bootstrap circuit configured to output a second equalization voltage higher than a voltage of the first power supply based on the second equalization signal.

12. The transmitter of claim 11, wherein the driver control circuit further comprises a second selector configured to select an output of the second controller or an output of the second equalization controller based on the second equalization signal.

13. The transmitter of claim 11, wherein the second bootstrap circuit includes a second capacitor for charging when the data signal does not transition from the high level to the low level.

14. The transmitter of claim 13, wherein capacitance of the second capacitor varies based on a control signal.

15. The transmitter of claim 4, wherein the second equalization controller includes a second equalization voltage transfer circuit to output a second equalization voltage based on the second equalization signal, wherein the second equalization voltage is higher than a voltage of the first power supply and the second equalization voltage is generated by the second equalization controller.

16. The transmitter of claim 15, wherein the second equalization controller controls an output of the second controller to be at a high-impedance state based on the second equalization signal.

* * * * *